United States Patent [19]

Landeck et al.

[11] Patent Number: 5,413,627
[45] Date of Patent: May 9, 1995

[54] PROCESS FOR THE SELECTIVE REMOVAL OF INORGANIC AND/OR ORGANIC SULFUR COMPOUNDS

[75] Inventors: Heiner Landeck, Munich; Gerhard Ranke, Pöcking, both of Germany

[73] Assignee: Linde Aktiengesellschaft, Wiesbaden, Germany

[21] Appl. No.: 34,798

[22] Filed: Mar. 1, 1993

[30] Foreign Application Priority Data

Aug. 29, 1990 [DE] Germany ............ 40 27 239.7

[51] Int. Cl.⁶ .................................. C01B 17/00
[52] U.S. Cl. ...................... 95/235; 423/210; 423/220; 423/226; 423/242.1; 423/242.6; 423/245.2
[58] Field of Search ............ 423/210, 220, 226, 227, 423/242.1, 242.6, 245.2; 95/235

[56] References Cited

U.S. PATENT DOCUMENTS

| | | | |
|---|---|---|---|
| 4,094,957 | 6/1978 | Sartori et al. | 423/223 |
| 4,217,238 | 8/1980 | Sartori et al. | 252/192 |
| 4,624,838 | 11/1986 | Pan et al. | 423/226 |
| 5,098,681 | 3/1992 | Christiansen et al. | 423/243 |

FOREIGN PATENT DOCUMENTS

| | | | |
|---|---|---|---|
| 8449 | 3/1950 | European Pat. Off. | 423/242.6 |
| 471592 | 2/1992 | European Pat. Off. | 423/242.6 |
| 1471541 | 1/1967 | France | 423/226 |
| 2545378 | 11/1984 | France . | |
| 4027239 | 3/1992 | Germany | 95/235 |
| 4027297 | 3/1992 | Germany | 95/235 |
| 1132922 | 11/1968 | United Kingdom | 423/226 |

*Primary Examiner*—Gary P. Straub
*Assistant Examiner*—Timothy C. Vanoy
*Attorney, Agent, or Firm*—Millen, White, Zelano & Branigan

[57] ABSTRACT

For the selective removal of sulfur from gases, a physical scrubbing agent is used, comprising a heterocycle having five or more ring atoms, which contains two heteroatoms, one of which is nitrogen and the other of which is oxygen or nitrogen; and the heteroatoms in the rings of even member number of atoms occupy one of the positions from 1,2 to 1,n/2 and, in the rings of uneven member number of atoms occupy one of the positions from 1,2 up to 1, (n-1)/2. Further, the nitrogen heteroatom(s) present in the ring is/are either double bonded or single bonded but, if single bonded, the nitrogen is organo-substituted.

34 Claims, 2 Drawing Sheets

PROCESS FOR THE SELECTIVE REMOVAL OF INORGANIC AND/OR ORGANIC SULFUR COMPOUNDS

CROSS-REFERENCE TO RELATED APPLICATION

This application is a continuation-in-part of International Application PCT/EP91/01622, filed Aug. 26, 1991, now WO4204102-A published on 19 Mar. 1992 designating the United States, based on German Priority Application P 40 27 239.7, filed Aug. 29, 1990.

BACKGROUND OF THE INVENTION

The invention relates to a process for the selective removal of inorganic and/or organic sulfur compounds, such as $H_2S$, COS, $CS_2$, thiols, and the like, from gases which contain, in addition, at least one of the components $H_2$, $N_2$, Ar, $CO_2$, CO, and aliphatic hydrocarbons by scrubbing with a physical scrubbing agent, i.e., a scrubbing agent which does not depend on a chemical reaction with the absorbed compound.

For the selective removal of sulfur compounds from gases which, besides $H_2S$, can contain other inorganic and organic sulfur compounds, such as, for example, COS, $CS_2$, thiols, etc., physical, as well as chemical, scrubbing agents have been used for many years.

A detailed discussion of various scrubbing processes can be found, for example, in A. L. Kohl, F. C. Riesenfeld: "Gas Purification," 4th ed , Gulf Publishing Co., Houston, Tex. (1985); S. A. Newman (Editor): "Acid and Sour Gas Treating Processes," Gulf Publishing Co., Houston, Texas (1985); as well as in R. N. Maddox: "Gas Conditioning and Processing," Vol. IV, Campbell Petroleum Series, Norman, Okla. (1982).

With physical scrubbing agents, because of the different specific physical intermolecular interactions between individual functional groups of the scrubbing agent or of the scrubbing agent molecule in its structural composition as a whole, individual gas components are preferably absorbed from gas mixtures. The specific solubility characteristics are also affected by different arrangements of the same functional groups in the scrubbing agent molecule, since the different locations of the functional groups cause different electron configurations. In these processes, the most important process steps, i.e., absorption of the components to be scrubbed out and regeneration of the scrubbing agent, are determined by the specific physical solubility characteristics of the individual gas components. As physical scrubbing agents in known processes, there can be mentioned, for example, methanol, N-methylpyrrolidone (NMP) and polyethylene glycol dialkyl ether (PGE), among others.

Acid gas removal by chemical scrubbing agents is based on a completely different principle which takes advantage of the fact that specific chemical or electrolytic reactions take place between individual solvent components and the acid gas components to be scrubbed out*-*. In chemical scrubbing processes for the selective removal of sulfur, there have been used preferably tertiary amines, e.g., methyldiethanolamine (MDEA), in aqueous solutions, with the water content being usually more than 40% by weight.

With these processes, besides the physical, chemical and electrolytic balances, the kinetics and the transport processes are thus the dominant valves.

It is also known to remove sulfur components by both physically and chemically active scrubbing agents, so-called hybrid scrubbing agents. This type of scrubbing agent uses the advantages of the chemical as well as those of the physical scrubbing agents. Thus, by the presence of purely physical scrubbing agent components, organic sulfur compounds can also be scrubbed out, which with a purely chemical scrubbing agent is possible only in a limited way.

To increase the selectivity between $CO_2$ and $H_2S$ in these processes, i.a., advantage is taken of the fact that in aqueous solutions, the electrolytic and chemical reactions of $CO_2$ are partly kinetically hindered and occur at a substantially slower rate than those of $H_2S$. But since $H_2S$ must be scrubbed out to a residual content of a few ppm, normally 20 to 30% of the $CO_2$ contained in the crude gas is also scrubbed out.

With the known physical scrubbing agents, a substantial disadvantage exists insofar as besides $H_2S$ and less volatile sulfur components (for example, thiols, $CS_2$, etc.) there are also scrubbed out a considerable part of the $CO_2$ as well as higher hydrocarbons. In most cases, it is also necessary to conduct an at least partial separation of these additional components from the sulfur components to obtain a sulfur-rich fraction amenable-to the requisite conversion reactions to elementary sulfur in a relatively problem-free manner. In many cases this not only results in complicating the scrubbing process but also increases the consumption and the investment costs. Corresponding to the vapor pressure of the scrubbing agent, both the scrubbed product gas and the sulfur component fraction contain undesirable scrubbing agent components, which, on the one hand, increase the investment and operation costs of the system and, on the other hand, represent possibly troublesome impurities in the product gas.

The most important disadvantages in chemical scrubbing processes are that the selectivity between $H_2S$ and $CO_2$ is small and the energy consumption in the regeneration of the loaded scrubbing agent is relatively high. Further, in chemical scrubbing processes, loading of the scrubbing agent is dependent on the chemical equilibrium. Since the chemical equilibriums are only slightly dependent on pressure, chemical scrubbing processes are preferably used at low pressures.

Conversely, with sulfur-containing synthesis gases at high pressures and with a higher $CO_2$ content, in which $CO_2$ can or is to remain in the scrubbed gas and the sulfur components are to be lowered to a few ppm, the use of physical scrubbing agents is significantly more advantageous in comparison with chemical scrubbing agents.

SUMMARY OF THE INVENTION

An object of this invention is to make available a scrubbing agent for selective sulfur removal, which, on the one hand, exhibits a relatively high selectivity between $H_2S$ and $CO_2$ and, on the other hand, offers the possibility of also removing COS and organic sulfur compounds, and which, further, has a low vapor pressure, so that the scrubbing can be performed at close to ambient temperature.

Another object is to provide a process for selective sulfur removal.

Upon further study of the specification and appended claims, further objects and advantages of this invention will become apparent to those skilled in the art.

To achieve these objects, a heterocyclic compound is used as a scrubbing agent having a number n of at least 5 atoms in the heterocyclic ring, of which 2 atoms are heteroatoms, i.e., a ring of at least 3 carbon atoms, with the heteroatoms being either nitrogen or oxygen, of which at least one heteroatom is nitrogen. The nitrogen atom or atoms are either single bonded or double bonded, but if single bonded, the remaining hydrogen is substituted. The two heteroatoms in rings of an even number of atoms occupy the 1,2-positions, up to the 1,n/2 positions. In rings of an uneven number of atoms the two heteroatoms occupy the positions 1,2 up to the 1,(n-1)/2 positions.

For the sake of simplicity, the basic structures according to the invention are designated below as heterocycles in which, besides nitrogen, oxygen can also occur as one heteroatom.

By a doubly bonded nitrogen heteroatom, it is to be understood that the nitrogen is completely bonded in the ring in a heteroaromatic manner or with a double bond and a single bond. The nomenclature used below is taken from the "Lehrbuch der organischen Chemie" [Textbook of Organic Chemistry], Beyer & Walter, 21st ed., S. Hirzel Verlag, Stuttgart (1988), FRG, as well as "Die systematische Nomenklatur der Organischen Chemie" [Systematic Nomenclature of Organic Chemistry], D. Hellwinkel, 3rd ed., Springer-Verlag, Berlin (1986), FRG.

With the scrubbing agents according to the invention, compounds are involved whose basic structure is a heterocycle with at least five ring atoms, with five- and six-membered rings being preferred. Further, the heterocycle contains two heteroatoms, which can both be nitrogen, or one nitrogen and the other oxygen. Examples of larger ring compounds include but are not limited to:

Oxazepines, Oxazepanes, Diazepines, Diazepanes and compounds with two rings, especially: 1,3-Dimethyl-1,3-diazepane-2-one or DMBU (Dimethyl-butyleneurea)(1)

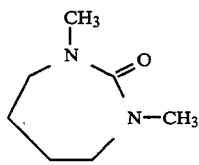

(1)

1,8-Diazabicyclo-(5,4,0)-undec-ene (DBU) (2),

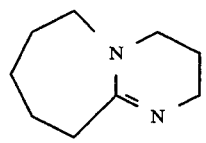

(2)

1,5-Diazabicyclo(4,3,0)non-5-ene (DBN) (3),

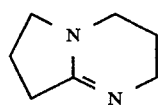

(3)

1,3-Oxazepine (4) and

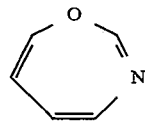

(4)

3H-1,2-Diazopine (5)

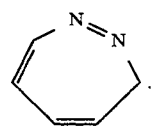

(5)

With the basic structures of the scrubbing agents according to the invention, any degree of saturation is possible. Thus there are included the heteroalkanes, which are saturated heterocyclic compounds, as well as the most highly unsaturated five- and six-membered rings designated as heteroaromatics, as well as the so-called heteroalkenes, having a degree of saturation between heteroalkanes and heteroaromatics.

Since, according to the invention, a physical scrubbing process is involved and thus a physically active scrubbing agent is used, the single bonded nitrogen atoms in the heterocycle must not carry any hydrogen as a ligand, but must instead be tertiary nitrogen atoms. The heteroalkane derivatives according to the invention have nitrogen heteroatoms which are organo-substituted. The single bonded nitrogen atoms of the heteroalkenes according to the invention are therefore organo-substituted, while nitrogen heteroatoms, which are part of the double bond, as with the heteroaromatics, for example, carry neither organic substituents nor hydrogen as ligands. If, for example, a heteroalkane has two nitrogen heteroatoms, all hydrogen ligands of these nitrogen heteroatoms, have to be organo-substituted. If the heterocycle according to the invention is present as a heteroalkene, the nitrogens can optionally be double bonded in the ring or carry organic substituents in the single bonds, and occur as mixed forms.

With the derivatives of the heteroalkanes and heteroalkenes according to the invention, the substituents can be the same or different. Thus, in this case of the heteroalkanes according to-the invention with two nitrogen heteroatoms, at most two different substituents can occur on the nitrogen atoms.

To be usable as a scrubbing agent for the selective sulfur removal, said heterocycles have to be chemically and thermally stable under scrubbing conditions. Since the stability increases with increasing saturation, heteroalkanes are preferred over heteroalkenes, and the latter are preferred Over heteroaromatics.

It has now been surprisingly shown that with the heterocycles according to the invention, certain positions of the heteroatoms affect the solvent properties in an especially favorably way. Thus, with rings of an even number of atoms, positions 1,2 to 1,n/2 stand out in comparison with the others. The positions 1,2 to 1,(n-1)/2 are preferred in rings of uneven number of atoms.

The especially preferred five- and six-membered representatives of the nitrogen heterocycles with two nitrogen heteroatoms are designated as 1,2-diazoles or 1,2-diazolidines and 1,2- or 1,3-diazines or 1,2- or 1,3-diazinanes, and the arrangement of the heteroatoms in the ring, as described above, is limited to certain positions. The five-membered representatives in the literature, depending on their degree of saturation, have the designations pyrazoles or pyrazolidines. The usual names in literature for the six-membered rings are: pyridazines or pyridazinanes as well as pyrimidines or pyrimidinanes. Each chemically stable representative of these basic structures and the derivatives formed with it can be used as a scrubbing agent for the selective removal of sulfur.

If one of the nitrogen heteroatoms is replaced by an oxygen atom, other basic structures according to the invention are obtained. The five- and six-membered heteroalkenes or heteroaromatics of this type of structure are designated as isoxazoles (=1,2-oxazoles) or 1,2- or 1,3-oxazines. Analogously to these, the heteroalkanes and their derivatives are combined under the general terms isoxazolidines or 1,2- or 1,3-oxazinanes. Just as in the case of five- and six-membered rings with two nitrogen heteroatoms, the above-specified positions of the heteroatoms are also decisive.

In following table I, exemplified parent structures of the scrubbing agents according to the invention are represented.

TABLE I

The following basic structures each show only one exemplary representative of all possible constitutionally isomeric forms of the five- and six-membered heterocycles and their derivatives according to the invention.

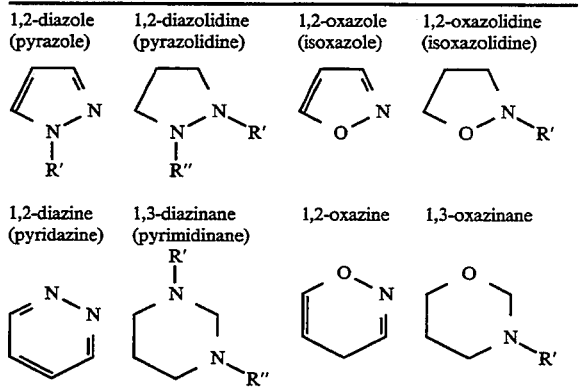

1,2-diazole (pyrazole)    1,2-diazolidine (pyrazolidine)    1,2-oxazole (isoxazole)    1,2-oxazolidine (isoxazolidine)

1,2-diazine (pyridazine)    1,3-diazinane (pyrimidinane)    1,2-oxazine    1,3-oxazinane R', R" designate organic radicals on substituted single bonded nitrogen heteroatoms (cf. Table II)

The above-named types belong to the especially preferred basic structures of the scrubbing agents according to the invention.

As already explained, the scrubbing agents according to the invention involve physically active scrubbing agents, therefore the singly bonded nitrogen has to be substituted.

According to the invention the organic substituent or substituents which replace hydrogen on at least one single bonded nitrogen heteroatom include but are not limited to alkyl, dialkylaminoalkyl, acylalkyl, alkyletheralkyl, dialkylamidealkyl, dialkylaminopolyaminoalkyl, alkylpolyether or dialkylaminopolyetheralkyl radicals (cf. Table II).

By selective substitution on the single bonded nitrogen heteroatoms, the scrubbing properties, starting from the respective parent structure, can be changed so that they are optimally adapted to the special boundary conditions of the scrubbing process. Such boundary conditions are set, for example, by the composition of the crude gas to be treated, its temperature, the further processing of the recovered sulfur-containing fraction, or for example, the temperature of the regeneration.

Further the scrubbing properties can be controlled according to the invention by selective substitutions on one or more ring carbon atoms.

Advantageously in this case at least one hydrogen ligand can be substituted on one or more ring carbon atoms by an alkyl, dialkylaminoalkyl, acylalkyl, alkyletheralkyl, dialkylamidealkyl, dialkylaminopolyaminoalkyl, alkylpolyether or dialkylaminopolymeralkyl group.

Of the above-named substituents the amine substituents occupy a special place. These ligands have to contain exclusively tertiary amine groups on the nitrogen heteroatoms or ring carbon atoms, i.e., no primary or secondary amino group (amine) bond must be present (cf. Table II).

In this case alkylaminodialkyl groups prove to be especially advantageous substituents.

Just like the nitrogen heteroatoms, the ring carbon atoms can be substituted in the same way or differently.

Further, it is particularly advantageous to replace at least one methylene group in the ring by a ring ketone group.

Following table II shows the organo substituents (ligands) according to the invention for the nitrogen heteroatoms and ring carbon atoms.

TABLE II

| Organic substituents (ligands) | Nitrogen heteroatom | Ring carbon atoms |
|---|---|---|
| Alkyl | $-(CH_2)_m-CH_3$ | $-(CH_2)_m-CH_3$ |
| dialkyl- amino- alkyl | $-(CH_2)_n-N\begin{array}{c}C_{n1}H_{2n1+1}\\C_{n2}H_{2n2+1}\end{array}$ | $-(CH_2)_{11}-N\begin{array}{c}C_nH_{2n+1}\\C_{n1}H_{2n1+1}\end{array}$ |
| acyl- alkyl | $-(CH_2)_m-\overset{O}{\underset{\|}{C}}-C_nH_{2n+1}$ | $-(CH_2)_m-\overset{O}{\underset{\|}{C}}-C_nH_{2n+1}$ |
| alkyl- ether- alkyl | $-(CH_2)_n-O-C_{n1}H_{2n1+1}$ | $-(CH_2)_m-O-C_nH_{2n+1}$ |

TABLE II-continued

| Organic substituents (ligands) | Nitrogen heteroatom | Ring carbon atoms |
|---|---|---|
| dialkyl-amide-alkyl | $-(CH_2)_n-C\begin{smallmatrix}\diagup N\diagdown C_{n1}H_{2n1+1}\\ \diagdown C_{n2}H_{2n2+1}\\ \|\\ O\end{smallmatrix}$ | $-(CH_2)_m-C\begin{smallmatrix}\diagup N\diagdown C_{n1}H_{2n1+1}\\ \diagdown C_{n2}H_{2n2+1}\\ \|\\ O\end{smallmatrix}$ |
| dialkylamino-polyamino-alkyl | $-(CH_2)_n-N\begin{smallmatrix}\diagup [(CH_2)_{n1}-N]_x-C_{n3}H_{2n3+1}\\ \|\\ C_{n2}H_{2n2+1}\\ \diagdown [(CH_2)_{n4}-N]_y-C_{n6}H_{2n6+1}\\ \|\\ C_{n5}H_{2n5+1}\end{smallmatrix}$ | $-(CH_2)_n-N\begin{smallmatrix}\diagup [(CH_2)_{n1}-N]_x-C_{n3}H_{2n3+1}\\ \|\\ C_{n2}H_{2n2+1}\\ \diagdown [(CH_2)_{n4}-N]_y-C_{n6}H_{2n6+1}\\ \|\\ C_{n5}H_{2n5+1}\end{smallmatrix}$ |
| alkyl-polyether | $-[(CH_2)_n-O]_x-(CH_2)_m-CH_3$ | $-(CH_2)_m-O-[(CH_2)_n-O]_x-(CH_2)_m-CH_3$ |
| dialkylamino-polyether-alkyl- | $-(CH_2)_n-O-[(CH_2)_{n4}-O]_y-(CH_2)_{n1}-N\begin{smallmatrix}\|\\ C_{n2}H_{2n2+1}\\ \|\\ C_{n3}H_{2n3+1}\end{smallmatrix}$ | $-(CH_2)_n-O-[(CH_2)_n-O]_y-(CH_2)_{n1}-N\begin{smallmatrix}\|\\ C_{n2}H_{2n2+1}\\ \|\\ C_{n3}H_{2n3+1}\end{smallmatrix}$ |

$m = (0 \ldots 4)$; $n, n_1 \ldots n_6 = (1 \ldots 4)$; $x = (2, \ldots, 6)$; $y = (0, \ldots, 6)$ (With the alkyl groups small values are preferred with m, n and $n_i$ (i = 1, ..., 6).

All the above-named basic structures provide better scrubbing properties in comparison with the prior art, and the scrubbing properties are specifically adapted to the process requirements by selective substitutions on the nitrogen heteroatoms and/or ring carbon atoms.

The following compounds are especially suitable within the context of the invention &s scrubbing agents:
1,3-dimethyl-1,3-diazinane-2-one
(1,3-dimethyl pyrimidinane-2-one)

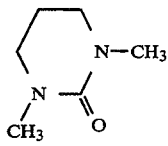

2-dimethyaminopropyl-2-oxazolidine
(2-dimethylaminopropyl isoxazolidine)

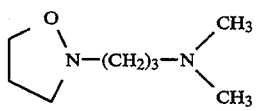

1,2-diethyl-1,2-diazinane-3-one
(1,2-diethyl pyridazinane-3-one)

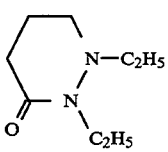

1,2-dimethyl-1,2-diazolidine-3-one
(1,2-dimethyl pyrazolidine-3-one)

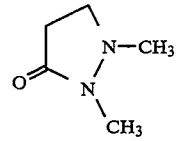

2-ethyl-2-oxadiazinane-3-one

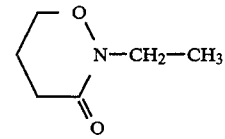

1,2,3-trimethyl-1,2-diazolidine-5-one
(1,2,3-trimethyl pyrazolidine-5-one)

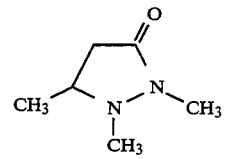

Other advantageous scrubbing agents are 1,3-di-(dimethylaminoethyl)-1,3-diazinane-2-one, as well as the dialkylaminoalkyl isoxazolidines and dilkylaminoalkyl isoxazolidinones.

Further, according to the invention, binuclear ring systems are suitable as scrubbing agents, and at least one ring is a heterocycle according to the invention. Thus,- there belong to the binuclear ring systems according to the invention both those that exhibit one carbocycle and one heterocycle according to the invention, and those that are composed of two heterocycles. Thus, in principle, any heterocycle can be combined with one of the heterocycles according to the invention into a compound; In this case, purely heterocyclic ring systems are preferred.

In another configuration of the invention the binuclear ring systems can be bonded on one another in a different way. Thus it is provided that a ring carbon atom or a nitrogen heteroatom of a nitrogen heterocycle carries the second ring system as a ligand. Also heterocyclic bridge systems, nitrogen-heterospiranes as well as condensed ring systems belong to the substances according to the invention.

Binuclear ring systems prove to be especially favorable as scrubbing agents in which the cycles are connected by tertiary polyalkylamino bridges.

TABLE III

Binuclear Ring Systems

A,A: heterocycle according to the invention
B,B: heterocycle (according to the invention or known) or carbocycle
N: nitrogen heteroatom
C: Ring carbon atoms Binuclear ring system without common ring atom

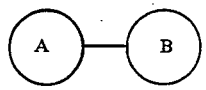

example: 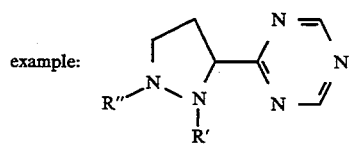

Bridge system (with a bridge containing of one or more methylene groups)

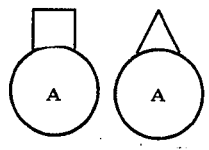

example 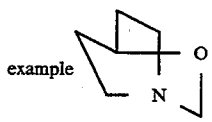

Heterospirane

example 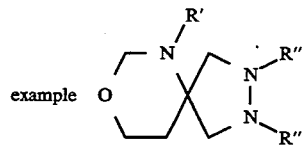

Condensed double rings

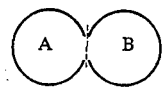

example 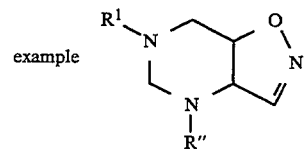

Rings connected by polyalkylamino bridge (PAA)

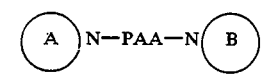

example 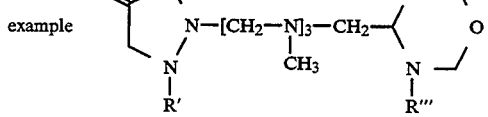

example 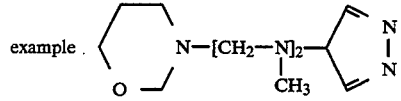

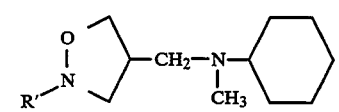

example 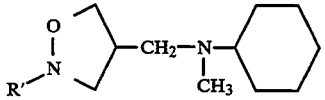

According to a particular further development of the invention, the scrubbing agents according to the invention can be used not only as individual components but also can be contained in a physically active scrubbing agent composite, in which at least one component is a heterocyclic compound according to the scrubbing agent comprising from 20%, preferably from 40% up to and including 100% more preferably from 45% up to 90%, of a heterocyclic compound of this invention.

The use of a scrubbing agent composite often offers the advantage that the properties of the scrubbing agent mixture to be used can be especially adjusted to the respective specific separation tasks. Further as a result there is a possibility of using those heterocycles classified as scrubbing agents, which under the process conditions are present in solid or highly viscous form, in solution for the selective sulfur removal by physical scrubbing. In this case the concentration of the solid heterocyclic components is selected so that they always remain in solution during process conditions.

Examples of scrubbing agent composites or mixtures include but are not limited to scrubbing agents containing, in addition to at least one heterocyclic compound according to the invention, at least one of the following compounds:

TABLE A

NMP(1-Methyl-pyrrolidine-2-on)

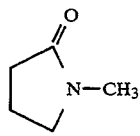

PGE(Polyethyleneglykol-dialkylether)

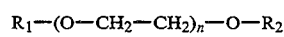

1,3,5-Trimethyl-1,3,5-triazinane

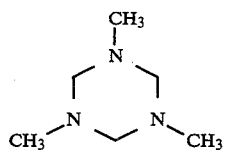

1,3,5-Trimethyl-1,3,5-triazinane-2-on

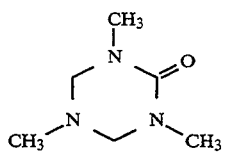

1,3,5-Tri-(dimethylaminoethyl)-1,3,5-triazinane

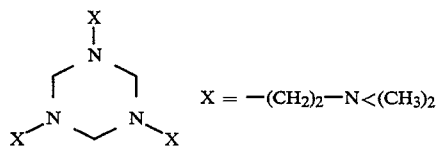

3,5-Dimethyl-1,3,5-oxadiazinane-4-on

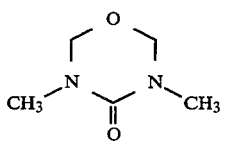

1,2,4-Trimethyl-3-dimethylamino-1,2,4-triazinane

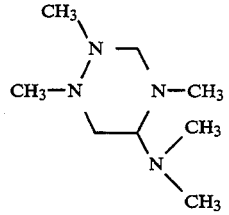

1,3,5-Trialkyl-1,3,5-triazinane (Alkyl = CnH2n + 1/n = 2, 3)

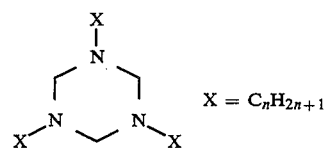

TABLE A-continued 1,2,4-Trimethyl-3-dimethylamino-1,2,4-triazolidine

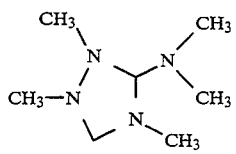

1-Dimethylaminopropyl-pyrrolidine-2-on

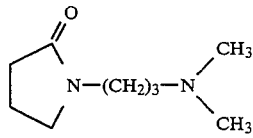

1-Dimethylaminoethyl-piperidinine-2-on

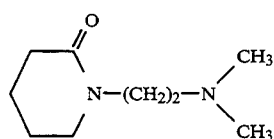

3-Dimethylaminoethyl-oxazolidine-4-on

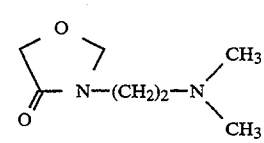

3-Propyloxazolidine-4-on

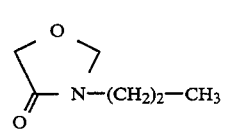

2-Dimethylamino-propyl-isoxazolidine

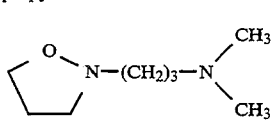

1-Dimethylaminopropyl-imidazole

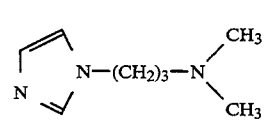

1-Methyl-3-dimethylaminoethyl-imidazolidine-2-on

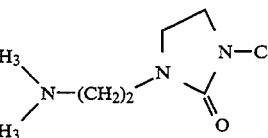

1-Methyl-4-dimethylaminoethyl-1,4-diazinane-2-on

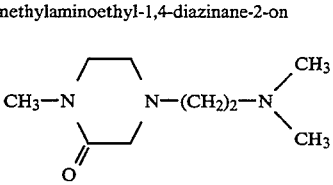

TABLE A-continued 1,4-Di-(dimethylaminoethyl)-1,4-diazinane

1,4-Dimethyl-1,4-diazinane-2,5-dion

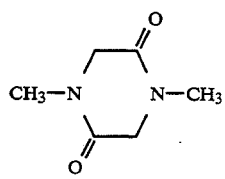

1,4-Di-(dimethylaminoalkyl)-1,4-diazinane-2-on
(Alkyl = $C_nH_{2n+1}$/n = 1, 2, 3)

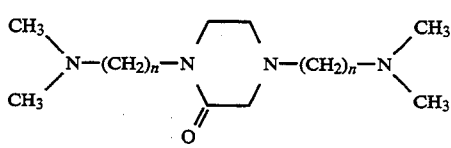

1-Methyl-3-dimethylaminoethyl-imidazolidine

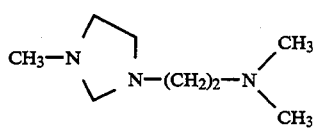

1-Methyl-4-dimethylaminoethyl-1,4-diazinane-2-on

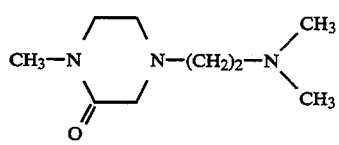

1-Methyl-4-dimethylaminoethyl-1,4-diazinane

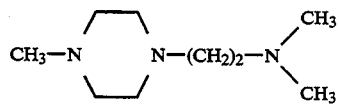

1,3-Dimethyl-5-dimethylamino-1,3-diazinane

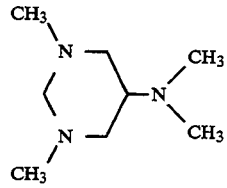

4-Dimethylaminoethyl-4-oxazinane-3-on

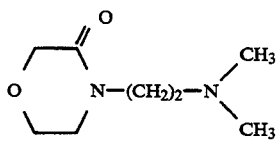

4-Dimethylaminoethyl-2-dimethylamino-4-oxazinane

TABLE A-continued

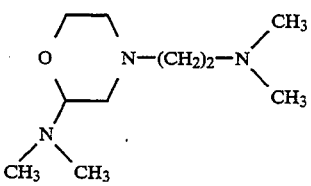

1-Methyl-4-dimethylamino-pyrrolidine-2-on

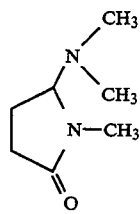

1-Methyl-4-dimethylamino-piperidine-2-on

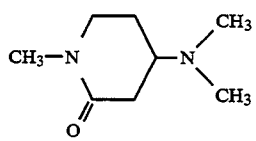

The scrubbing agents according to the invention can be especially used ill all physical absorption systems intended for the scrubbing out of sulfur compounds, especially of $H_2S$, while permitting $CO_2$ to remain in the scrubbed product gas. It is therefore preferable for the scrubbing agents to have a good selectivity between sulfur compounds and $CO_2$. They are, however, just as suitable for scrubbing out less volatile sulfur compounds, such as thiols or $CS_2$, but in this case, the regeneration of the loaded scrubbing agent must be appropriately adjusted.

In comparison with conventional scrubbing agents, generally lower amounts of energy consumption are associated with the use of the scrubbing agents according to the invention.

The scrubbing agents and scrubbing agent composites, consisted on the basis of the basic structures according to the invention, contain, as usual in physical scrubbing agents, preferably as little water as possible. Depending on the scrubbing agent, the water portion should be 5% by weight at most, but 0.1 to 3% by weight is preferred.

Since in most cases the gases to scrubbed from sulfur components contain water, the latter, in scrubbing with the scrubbing agent according to the invention, is also largely removed. The previous extensive removal of the water component from the crude gas in a preliminary step is therefore not necessary. In some cases, this preliminary step is even undesirable since the water dissolved in the loaded scrubbing agent acts as a stripping gas in the regeneration.

The scrubbing agents according to the invention are suitable to treat pressurized crude gases containing sulfur components, with the pressure in the scrubbing column being generally between 10 and 120 bars, and preferably between 15 and 60 bars.

In this case, to be able to use the scrubbing agents according to the invention advantageously, the temperature of the scrubbing step should be between 0° C. and 80° C., preferably between 0° C. and 50° C.

The scrubbing agents according to the invention can be used for scrubbing crude gases having any $H_2S$ content. It is especially advantageous, however, if the $H_2S$ portion is between 0.1 and 10 mol %, with special preference the crude gas should contain 0.3 to 5 mol % of $H_2S$.

The $CO_2$ content in the crude gas can also be any value, but preferably it should be between 2 and 25 mol %.

Under such conditions, $H_2S$ contents in the scrubbed product gas can be reduced to the range of a few ppm with the scrubbing agents according to the invention.

BRIEF DESCRIPTION OF THE DRAWING

The attached

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

The entire disclosures of all applications, patents and publications, if any, cited above and below, and of corresponding West German Application P 40 27 239.7, filed Aug. 29, 1990, are hereby incorporated by reference.

EXAMPLES AND DETAILED DESCRIPTION OF DRAWING

In the example, a comparison is made between the selected representatives of the heterocyclic compounds according to the invention with the known scrubbing agents NMP (n-methylpyrrolidone) and PGE (polyethylene glycol dialkylether).

Figure 1:
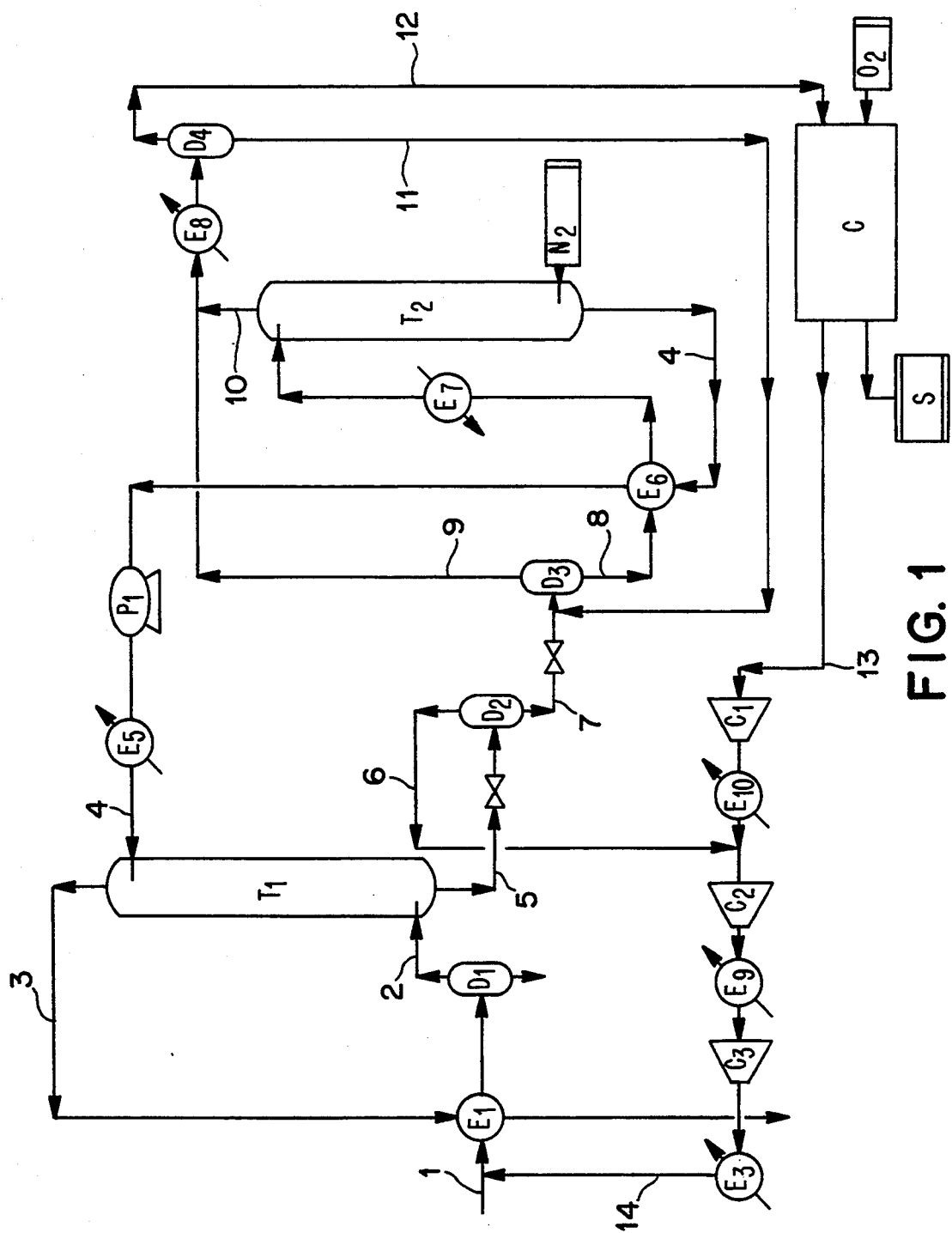
FIG. 1 and 2 are schematic representations of preferred comprehensive embodiment of the invention, using scrubbing agents according to the invention.

In a process according to FIG. 1, a $H_2S$-containing crude gas at 30 bars and 40° C. is introduced by pipe 1, and in heat exchanger E1 the gas is cooled to 20° C. in direct heat exchange relationship with cold product gas in pipe 3. In this case, the condensed water is separated in separator or trap D1, and via pipe 2, the crude gas to be scrubbed is fed to scrubbing column T1, where it is brought into contact with regenerated scrubbing agent. Before entry into the scrubbing column the regenerated scrubbing agent is cooled in cooler E5 to 0° C. At this temperature level, it is also assured that within the scrubbing column water cannot congeal as ice within the scrubbing column. The product gas, which is almost completely freed of $H_2S$, is removed at the head of scrubbing column T1 by pipe 3. The product gas, with a specified content of 10 ppm of $H_2S$, is heated in heat exchanger E1 against the crude gas to be cooled, and is available for further use. The loaded scrubbing agent, removed from the bottom of scrubbing column T1 by pipe 5, contains, besides the scrubbed $H_2S$, other components of the crude gas corresponding to their physical solubility in the scrubbing agent. These gases, which are also dissolved, are largely flashed and removed from the scrubbing agent with an intermediate expansion to 3.3 bars in separator D2 by pipe 6 and are mixed with hydrogenated Claus off-gas, compressed to 3.3 bars, and after further compression in compressor C2 to 10 bars or in compressor C3 to 30 bars, are fed to the crude gas by pipe 14.

The remaining loaded scrubbing agent is removed by pipe 7 and expanded to 1.5 bars, and resulting in a part of the $H_2S$ as well as the main part of the still dissolved $CO_2$ being flashed and separated in gaseous form in separator D3.

The scrubbing agent, still slightly loaded with $H_2S$, is heated in heat exchanger E6 against regenerated scrubbing agent and in heat exchanger E7 against steam to 115° C. and is fed to an upper part of regeneration column T2. In regeneration column T2, the residual dissolved $CO_2$ and $H_2S$ are stripped off with nitrogen so that resultant scrubbing agent, freed of the dissolved components, is removed by pipe 4 at the bottom of the regeneration column and can be recycled into scrubbing column T1 for a renewed scrubbing. The acid gas, removed at the head of regeneration column T2 in conduit 10, is mixed with the flash gas of pipe 9 coming from separator D3 and cooled to 0° C. in heat exchanger E8, and the main amount of the scrubbing agent vapor is condensed out. The condensate is removed in downstream separator D4 and is mixed with the loaded scrubbing agent entering separator D3. The acid gas in pipe 12, freed of scrubbing agent, is fed to a Claus unit C, where with addition of oxygen, elementary sulfur is produced. The hydrogenated Claus off-gas from pipe 13, which still contains sulfur compounds, is joined with the flash gas in pipe 6 after compression in compressor C1 and cooling in heat exchanger E10.

The following table IV shows that selected representative examples of the scrubbing agents according to the invention are more efficient in comparison with known scrubbing agents.

TABLE IV

| Crude gas: 1000 mol/sec; p = 30 bars; T = 40° C. | | | | | |
|---|---|---|---|---|---|
| $H_2$ | | 36 mol % | | | |
| CO | | 47 mol % | | | |
| $CO_2$ | | 16 mol % | | | |
| $H_2S$ | | 1 mol % | | | |
| Production specification: 10 ppm of $H_2S$ in product gas (pipe 3) | | | | | |
|  | DMDAO | DAPIO | DEPAO | DMPLO | NMP | PGE |
| Scrubbing agent circulation (kg/s) | 24 | 24 | 23 | 23 | 25 | 37 |
| Stripping gas requirement (mol/s) | 16 | 18 | 17 | 18 | 20 | 10 |
| S concentration Claus fraction (mol %) | 29.9 | 26.1 | 27.8 | 25.4 | 24.5 | 27.3 |
| T (bottom T1) | 20 | 19 | 18 | 21 | 20 | 15 |

TABLE IV-continued

Crude gas: 1000 mol/sec; p = 30 bars; T = 40° C.
| | | |
|---|---|---|
| $H_2$ | 36 mol % | |
| CO | 47 mol % | |
| $CO_2$ | 16 mol % | |
| $H_2S$ | 1 mol % | |

Production specification: 10 ppm of $H_2S$ in product gas (pipe 3)

| | DMDAO | DAPIO | DEPAO | DMPLO | NMP | PGE |
|---|---|---|---|---|---|---|
| (°C.) | | | | | | |
| Consumption numbers | | | | | | |
| 1. Electric power (kw electrically) | | | | | | |
| pumps | 96 | 98 | 96 | 94 | 100 | 150 |
| compression | 492 | 578 | 531 | 551 | 649 | 607 |
| external cold | 213 | 226 | 228 | 223 | 224 | 303 |
| TOTAL | 801 | 882 | 855 | 868 | 973 | 1060 |
| 2. Steam requirement (kw thermally) | 599 | 738 | 711 | 689 | 764 | 831 |

DMDAO: 1,3-dimethyl-1,3-diazinane-2-one
DAPIO: 2-dimethylaminopropyl isoxazolidine
DEPAO: 1,2-diethyl-pyridazinane-3-one
DMPLO: 1,2-dimethyl pyrazolidine-3-one
NMP: N-methyl-2-pyrrolidone
PGE: polyethylene glycol dialkyl ether The following Table V gives an overview about the composition of the streams in example 1 using in a process according to FIG. 1 1,3-dimethyl-1,3-diazinane-2-one (DMDAO) as scrubbing agent:

TABLE V

| pipe 1 | t = 40° C. | $H_2$ | 36.0 mol % |
|---|---|---|---|
| | p = 30.0 bar | $N_2$ | 0.0 mol % |
| | total flow = 1000 mol/s | CO | 47.0 mol % |
| | | $CO_2$ | 16.0 mol % |
| | | $H_2S$ | 1.0 mol % |
| pipe 14 | t = 40° C. | $H_2$ | 0.4 mol % |
| | p = 30.0 bar | $N_2$ | 41.8 mol % |
| | total flow = 38.7 mol/s | CO | 6.5 mol % |
| | | $CO_2$ | 47.0 mol % |
| | | $H_2S$ | 4.3 mol % |
| | | DMDAO | 2 ppm |
| pipe 2 | t = 20° C. | $H_2$ | 34.7 mol % |
| | p = 30.0 bar | $N_2$ | 1.6 mol % |
| | total flow = 1,038.7 mol/s | CO | 45.5 mol % |
| | | $CO_2$ | 17.2 mol % |
| | | $H_2S$ | 1.1 mol % |
| pipe 3 | t = 6.9° C. | $H_2$ | 35.8 mol % |
| | p = 30.0 bar | $N_2$ | 1.6 mol % |
| (overhead T1) | total flow = 1,006.2 mol/s | CO | 46.7 mol % |
| | | $CO_2$ | 15.9 mol % |
| | | $H_2S$ | 10 ppm |
| pipe 4 | t = 0° C. | DMDAO | 99.9 mol % |
| | p = 30.0 bar | $N_2$ | 558 ppm |
| | total flow = 200.0 mol/s | $H_2S$ | 8 ppm |
| pipe 5 | t = 20.3° C. | $H_2$ | 667 ppm |
| (fed to T1) | p = 30.0 bar | $N_2$ | 115 ppm |
| | total flow = 232.4 mol/s | CO | 1.0 mol % |
| | | $CO_2$ | 7.8 mol % |
| | | $H_2S$ | 5.0 mol % |
| | | DMDAO | 86.0 mol % |
| pipe 6 | t = 18.6° C. | $H_2$ | 1.2 mol % |
| | p = 3.3 bar | $N_2$ | 0.2 mol % |
| | total flow = 12.3 mol/s | CO | 19.6 mol % |
| | | $CO_2$ | 72.4 mol % |
| | | $H_2S$ | 6.5 mol % |
| | | DMDAO | 5 ppm |
| pipe 7 | t = 18.6° C. | $H_2$ | 3 ppm |
| | p = 3.3 bar | $N_2$ | 2 ppm |
| | total flow = 220.1 mol/s | CO | 535 ppm |
| | | $CO_2$ | 4.2 mol % |
| | | $H_2S$ | 4.9 mol % |
| | | DMDAO | 90.8 mol % |
| pipe 8 | t = 17.1° C. | CO | 28 ppm |
| | p = 1.5 bar | $CO_2$ | 2.3 mol % |
| | total flow = 215.5 mol/s | $H_2S$ | 4.8 mol % |
| | | DMDAO | 92.9 mol % |
| pipe 9 | t = 17.1° C. | $H_2$ | 114 ppm |
| | p = 1.5 bar | $N_2$ | 85 ppm |
| | total flow = 5.0 mol/s | CO | 2.2 mol % |

TABLE V-continued

| | | $CO_2$ | 84.9 mol % |
|---|---|---|---|
| | | $H_2S$ | 12.9 mol % |
| | | DMDAO | 1 ppm |
| pipe 10 | t = 113.8° C. | $N_2$ | 71.3 mol % |
| | p = 1.5 bar | CO | 7 ppm |
| | total flow = 22.6 mol/s | $CO_2$ | 3.5 mol % |
| | | $H_2S$ | 24.3 mol % |
| | | DMDAO | 0.8 mol % |
| $N_2$ | t = 25° C. | $N_2$ | 100.0 mol % |
| | p = 1.5 bar | | |
| | total flow = 16.2 mol/s | | |
| pipe 4 | t = 111.8° C. | DMDAO | 99.9 mol % |
| (withdrawn from T2) | p = 1.5 bar | $N_2$ | 558 ppm |
| | total flow = 100.0 mol/s | $H_2S$ | 8 ppm |
| pipe 11 | t = 0° C. | $N_2$ | 137 ppm |
| | p = 1.5 bar | CO | 4 ppm |
| | total flow = 0.35 mol/s | $CO_2$ | 0.9 mol % |
| | | $H_2S$ | 16.6 mol % |
| | | DMDAO | 82.5 mol % |
| pipe 12 | t = 0° C. | $H_2$ | 16 ppm |
| | p = 1.5 bar | $N_2$ | 44.3 mol % |
| | total flow = 36.4 mol/s | CO | 0.3 mol % |
| | | $CO_2$ | 25.5 mol % |
| | | $H_2S$ | 29.9 mol % |
| | | DMDAO | 1 ppm |
| pipe 13 | t = 40° C. | $N_2$ | 61.1 mol % |
| | p = 1.05 bar | CO | 0.4 mol % |
| | total flow = 26.4 mol/s | $CO_2$ | 35.1 mol % |
| | | $H_2S$ | 3.2 mol % |

The comparison of the different solvents in Table IV- and the composition of streams of Table V is based on a process for the sulfur removal from a coal based raw gas and the further use of the sulfur-free product gas in a combined cycle power station. In such a case the use of nitrogen as stripping gas in regeneration column T2 and the recycle of the Claus off-gas via pipe 13 and pipe 14 to the crude gas in pipe 1 are advantages. In the case of producing a synthesis gas the use of nitrogen as a stripping gas and the recycle of the Claus off-gas is not opportune, as the gas is diluted with additional $N_2$ and $CO_2$. To show the influence of these other conditions in the case of producing a synthesis gas, a second example is carried out in FIG. 2. The main differences of the process according to FIG. 2, in comparison to FIG. 1, are:

a) The process is changed to the use of steam (E 17) in a reboiler (pipes 29 and 30) instead of preheating the scrubbing agent in heat exchanger E 7 of FIG. 1.

b) The final purification of the Claus off-gas takes place in a separate unit using known processes. Therefore, the treatment of the acid gas in pipe 27 e.g. feeding to a Claus unit is not shown in FIG. 2.

Figure 2:
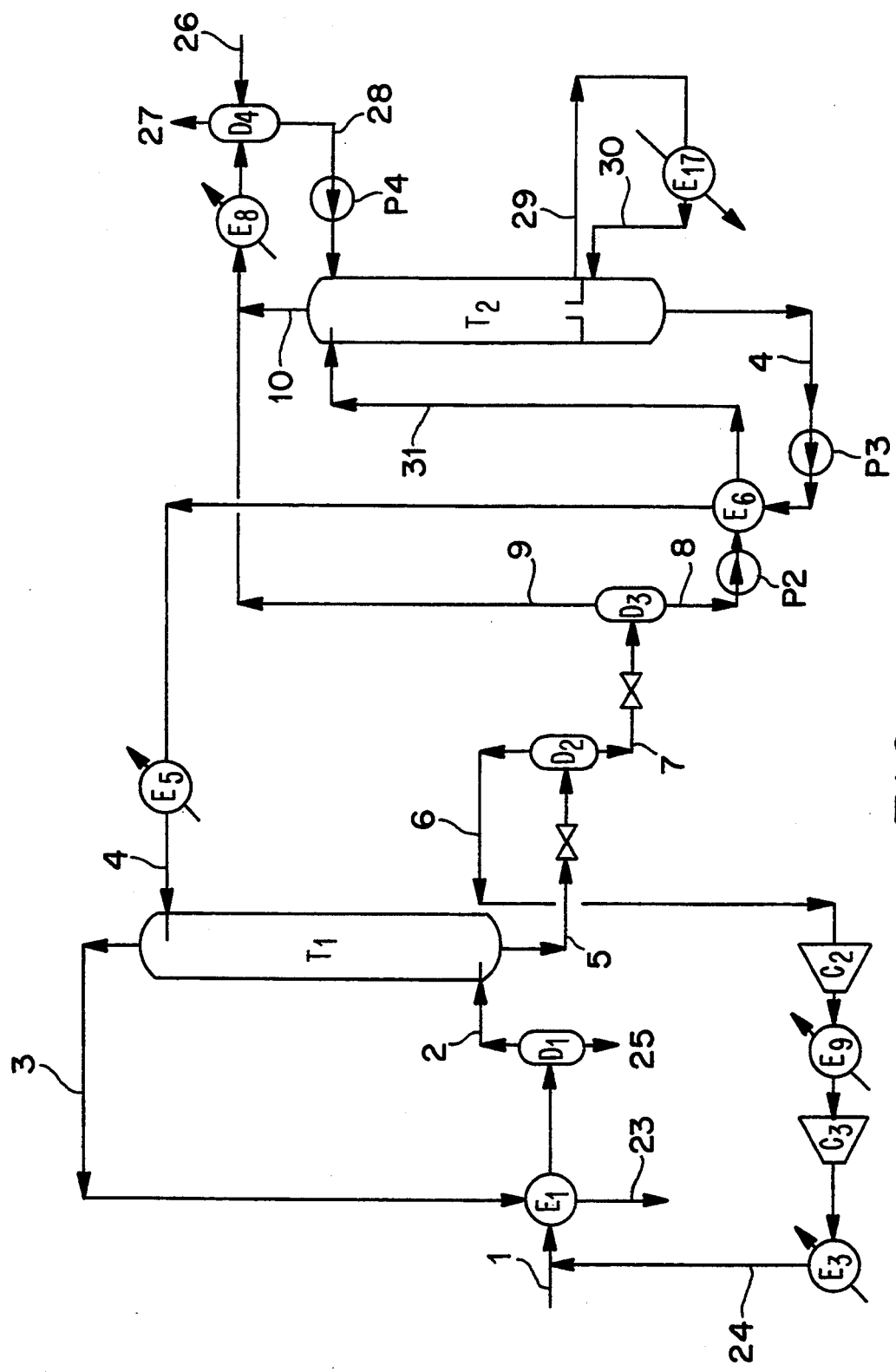

In the example of FIG. 2 the crude gas in pipe 1 with a temperature of 35° C., a pressure of 35 bar and an amount of 50,000 Nm³/h contains:

| | | |
|---|---|---|
| $H_2$ | 37.5 mol % | 18,750 Nm³/h |
| $N_2$ | 1.0 mol % | 500 Nm³/h |
| CO | 40.0 mol % | 20,000 Nm³/h |
| $CO_2$ | 20.0 mol % | 10,000 Nm³/h |
| $H_2S$ | 1.5 mol % | 750 Nm³/h |
| Sum | 100.0 mol % | 50,000 Nm³/h |
| $H_2O$ | | 95 Nm³/h |

In separator D1 a condensate 25 of 53 Nm³/h $H_2O$ containing ppm $CO_2$ and 9 ppm $H_2S$ is separated from crude gas. The crude gas is fed to column T1, where it is scrubbed in this example 2 with 75.8 t/h of 1,3-dimethyl-1,3-diazinane-2-one (DMDAO), which is also called 1,3-dimethyl-1,3-propylene-urea (DMPU) This scrubbing agent contains in this case 6 weight-% water.

The product gas in pipe 23 contains:

| | | |
|---|---|---|
| $H_2$ | 39.0 mol % | 18,747 Nm³/h |
| $N_2$ | 1.0 mol % | 500 Nm³/h |
| CO | 41.5 mol % | 19,996 Nm³/h |
| $CO_2$ | 18.5 mol % | 8,909 Nm³/h |
| $H_2S$ | 5 ppm | |
| Sum | 100.0 mol % | 48,152 Nm³/h |
| $H_2O$ | | 5 Nm³/h |

The acid gas in pipe 27 withdrawn from separator D4 contains:

| | | |
|---|---|---|
| $H_2$ | 0.2 mol % | 3 Nm³/h |
| $N_2$ | 69 ppm | |
| CO | 0.2 mol % | 4 Nm³/h |
| $CO_2$ | 59.0 mol % | 1,091 Nm³/h |
| $H_2S$ | 40.6 mol % | 750 Nm³/h |
| Sum | 100.0 mol % | 1,848 Nm³/h |
| $H_2O$ | | 84 Nm³/h |

The stripping gas in pipe 30 is produced by partial evaporation of the scrubbing agent in pipe 29, whereby steam is used in heat exchanger E 17. In order to reduce the boiling temperature of the scrubbing agent, a certain amount of water is added to the scrubbing agent. Therefore, 53 Nm³/h of fresh water (20.5° C., 34.7 bar) are fed via pipe 26 to separator D 4. The condensate in pipe 28 from separator D 4 is pumped (P 4) in regeneration column T2. The consumption numbers of the described process of example 2 are:

| | |
|---|---|
| steam | 1,250 kW |
| cooling water | 570 kW and |
| electric power | 130 kW. |

Table VI shows the temperature and pressure of several streams of example 2 according to FIG. 2:

TABLE VI

| STREAM | TEMPERATURE | PRESSURE |
|---|---|---|
| pipe 1 (prior to E1) | 35° C. | 35 bar |
| pipe 1 (downstream E1) | 20.7° C. | 34.7 bar |
| pipe 3 (overhead T1) | 8.7° C. | 34.2 bar |
| pipe 23 | 25° C. | 33.9 bar |
| pipe 4 (downstream E5) | 5° C. | 34.2 bar |
| pipe 5 | 18.2° C. | 34.7 bar |
| pipe 6 | 19.1° C. | 11.5 bar |
| pipe 24 | 35° C. | 35 bar |
| pipe 8 (downstream E6) | 16.3° C. | 5 bar |
| pipe 9 | 16.2° C. | 1.7 bar |
| pipe 31 | 129.7° C. | 1.5 bar |
| pipe 10 | 93.5° C. | 1.45 bar |
| mixture of pipes 9 and 10 (prior to E8) | 93.4° C. | |
| mixture of pipes 9 and 10 (downstream of E8) | 35° C. | 1.3 bar |
| pipe 27 | 35° C. | 1.3 bar |
| pipe 29 | 142.5° C. | |
| pipe 30 | 149.8° C. | |
| pipe 4 (withdrawn from bottom of T2) | | 1.6 bar |
| pipe 4 (downstream of P3) | 150° C. | 38 bar |
| pipe 4 (downstream of E6) | 26.3° C. | 37.5 bar |

The preceding examples can be repeated with similar success by substituting the generically or specifically described reactants and/or operation conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a process for the selective removal of at least one inorganic and/or organic sulfur compound from a crude gas containing also at least one of $H_2$, $N_2$, Ar, $CO_2$, CO, or an aliphatic hydrocarbon by scrubbing with a physical scrubbing agent, the improvement which comprises employing as said scrubbing agent a composition comprising a heterocyclic compound comprising a heterocycle having in the heterocyclic ring a number of ring atoms n greater than or equal to 5, with at least two heteroatoms being nitrogen or oxygen, of which at least one heteroatom is a single bonded or double bonded nitrogen and, if singly bonded, organo-substituted, the heteroatoms in rings of an even number of members occupying one of the positions from 1,2 to 1,n/2 and, in rings of an uneven number of members, occupying one of the positions from 1,2 up to 1,(n-1)/2.

2. A process according to claim 1, wherein the heterocyclic compound comprises a five-membered heterocycle.

3. A process according to claim 1, wherein the heterocyclic compound Comprises a six-membered heterocycle.

4. A process according to claim 1, wherein the two heteroatoms are nitrogen.

5. A process according to claim 1, wherein the two heteroatoms are nitrogen and oxygen.

6. A process according to claim 1, wherein the heterocycle is a pyrazole, a pyrazolidine, a pyridazine, a pyridazinane, a pyrimidine, or a pyrimidinane.

7. A process according to claim 1, wherein the heterocycle is an isoxazole; an isoxazolidine; a 1,2-oxazine; a 1,2-oxazinane; a 1,3-oxazine; or a 1,3-oxazinane.

8. A process according to claim 1, wherein the heterocycle contains a single bonded nitrogen heteroatom organo-substituted by alkyl, dilkylaminoalkyl, acylalkyl, alkyletheralkyl, dialkylamidealkyl, dialkylamino poly-aminoalkyl, alkylpolyether, or dialkylaminopolyetheralkyl group.

9. A process according to claim 1, wherein the heterocycle contains a ring ketone group.

10. A process according to claim 1, wherein at least one hydrogen atom on one or more ring carbon atoms is substituted by an alkyl, dilkylaminoalkyl, acyl-alkyl, alkyletheralkyl, dialkylamidealkyl, dialkyaminopolyamino-alkyl, alkylpolyether, or dialkylaminopolyetheralkyl group.

11. A process according to claim 1, wherein the scrubbing agent is used at a scrubbing column pressure between 10 and 120 bars.

12. A process according to claim 1, wherein the scrubbing agent is used at a scrubbing column pressure between 15 and 60 bars.

13. A process according to claim 1, wherein the scrubbing agent is used at a scrubbing temperature between 0° C. and 80° C.

14. A process according to claim 12, wherein the scrubbing agent is used at a scrubbing temperature between 0° C. and 80° C.

15. A process according to claim 14, wherein the temperature is between 0° C. and 50° C.

16. A process according to claim 1, wherein crude gas has an $H_2S$ content of 0.1 to 10 mol %.

17. A process according to claim 16, wherein crude gas has an $H_2S$ content of 0.3 to 5 mol %.

18. A process according to claim 1, wherein the scrubbing agent has an $H_2O$ content of up to 5% by weight.

19. A process according to claim 1, wherein the scrubbing agent has an $H_2O$ content of between 0.1 and 3% by weight.

20. A process according to claim 1, wherein the scrubbing agent comprises at least one of 1,3-dimethyl-1,3-diazinane-2-one; 2-dimethyaminopropyl-1,2-oxazolidine; 1,2-diethyl-1,2-diazinane-3-one; 1,2-dimethyl-1,2-diazolidine-3-one; 2-ethyl-1,2-oxadiazinane-3-one; 1,2,3-trimethyl-1,2-diazolidine-5-one; or 1,3-di-(dimethylaminoethyl)-1,3-diazinane-2-one.

21. A process according to claim 1, wherein the heterocycle is a part of a binuclear ring system.

22. A process according to claim 1, wherein the heterocycle is connected to another ring by a polyalkylamino bridge.

23. A process according to claim 1, wherein the scrubbing agent is a composite of at least two different compounds.

24. A process according to claim 1, wherein the scrubbing agent composition is used comprising from 20% preferably from 40%, up to and including 400%, of said heterocyclic compound.

25. A process according to claim 24, wherein the scrubbing agent composition comprises 45–90% of said heterocyclic compound.

26. A process according to claim 1, with the provision that when the heterocycle is six-membered and contains two nitrogen heteroatoms, the heterocycle further contains at least one of (a) a double bond in the ring and (b) a further heteroatom.

27. A process according to claim 1, wherein said heterocycle is an oxazepine, an oxazepane, a diazepine, a diazepane, or a compound with two rings.

28. A process according to claim 27, wherein said heterocycle is 1,3-dimethyl-1,3-diazepane-2-one; 1,8-diazabicyclo-(5,4,0)-undec-ene; 1,5-diazabicyclo-(4,3,0)-non-5-ene; 1,3-oxazepine; or 3H-1,2-diazepine.

29. A process according to claim 1, wherein said heterocycle is a 1,2-diazole or 1,2-diazolidine; a 1,2- or 1,3-diazine; or a 1,2- or 1,3-diazinane.

30. A process according to claim 1, wherein the scrubbing agent composition contains at least one compound from Table A in addition to and different from said heterocycle.

31. A process according to claim 1, wherein the sulfur compound is $H_2S$, COS, $CS_2$, or a thiol.

32. A process according to claim 26, wherein the heterocycle contains two or three double bonds.

33. A process according to claim 20, wherein the scrubbing agent composition comprises 1,3-dimethyl-1,3-diazinane-2-one.

34. A process according to claim 33, wherein the sulfur compound is $H_2S$, COS, $CS_2$, or a thiol.

* * * * *